June 14, 1932.   A. P. OLINGER   1,862,903
CONTROL FOR SCRAPERS
Filed June 26, 1931
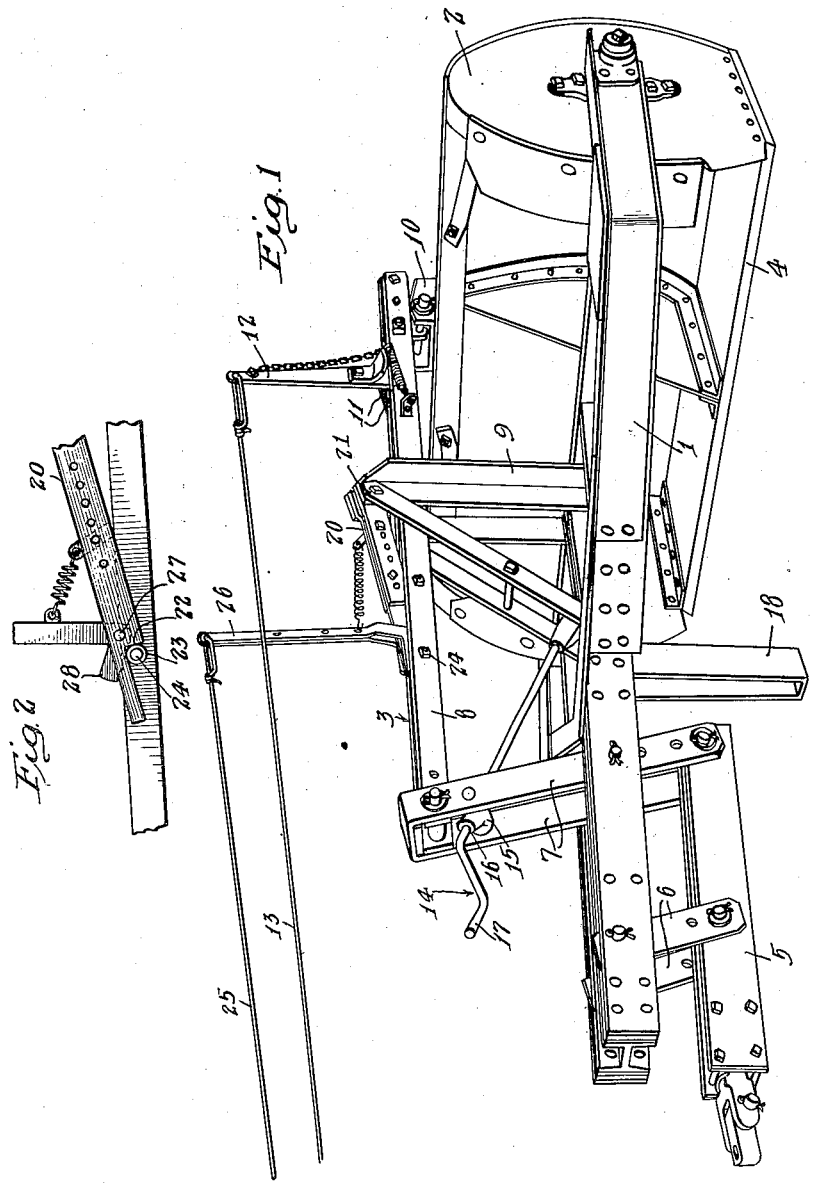
Inventor
Alvin P. Olinger
By Lyon & Lyon
Attorneys Patented June 14, 1932

1,862,903

UNITED STATES PATENT OFFICE

ALVIN P. OLINGER, OF WICHITA, KANSAS, ASSIGNOR TO KILLEFER MANUFACTURING COMPANY, OF LOS ANGELES, CALIFORNIA, A CORPORATION OF CALIFORNIA

CONTROL FOR SCRAPERS

Application filed June 26, 1931. Serial No. 546,970.

This invention relates to an improved control for scrapers of that type which utilizes the tractive force acting through a movable draw-bar to stop further loading of the scraper bowl by rotating the bowl to elevate the cutting edge thereof from a cutting to a carrying position.

Heretofore scrapers using the draft force acting through a movable draw-bar to rotate the scraper bowl from a cutting to a carrying position have endeavored to so balance the forces acting upon the scraper bowl that the bowl will not be rotated until a predetermined load has been accumulated. As a result, as the load gradually accumulates the tractive effort necessary to move the scraper forward gradually becomes greater and therefore, gradually overcomes the forces tending to hold the bowl in cutting position, with the result that the bowl is gradually rotated to elevate the cutting edge from a cutting to a carrying position.

A further or far more serious difficulty resulting from balancing of the forces acting to rotate the bowl is that as the scraper must operate in a great number of different types of soil and under different conditions of the same type of soil as, for example, certain portions of the soil may be wetter or may have a greater amount of vegetation such as weeds mixed therewith so that it has been found practically impossible to continually adjust the scraper to meet continuously changing working conditions and, therefore, in many instances the tractive force will not be sufficient to rotate the bowl from cutting to carrying position, resulting in the overloading of the bowl and stalling of tractor, and requiring much manipulation to dump the load so that a new load may be gathered and with no assurance that a like occurrence will not be experienced. Also under other conditions such as wet, slippery soil or a soil having considerable grass to permit the scraper to slide easily and require little tractive effort to move the scraper, it is practically impossible to make the scraper bowl rotate into a cutting position.

It is therefore the principal object of this invention to so unbalance the forces acting to rotate the scraper bowl that under substantially all conditions the tractive force acting through the movable draw-bar will greatly over-balance the other forces acting upon the bowl and will positively and immediately rotate the bowl from a cutting to a carrying position and also to provide a latch for locking the scraper bowl in cutting position, and a lever operable from the tractor seat for releasing the latch when the desired load has been accumulated, thereby permitting the excessive force transmitted through the movable draw-bar to immediately and positively rotate the bowl to a carrying position.

Further objects of the invention will appear hereinafter.

The invention consists of novel parts and combinations of parts to be described, all of which contribute to produce an efficient improved control for scrapers.

A preferred embodiment of the invention is described in the following specification, while the broad scope of the invention is pointed out in the appended claims.

In the drawing:

Figure 1 illustrates a perspective view of the invention applied to one form of automatic rotary drag scraper.

Figure 2 illustrates a fragmental view of the latch.

The scraper as illustrated in Figure 1 includes the usual frame 1 to which is pivotally mounted a substantially cylindrical scraper bowl 2 and is provided with a control mechanism 3 adapted to receive force from a swinging draw-bar and transmit that force to the bowl to rotate the cutting edge 4 thereof from a cutting to a carrying position. The control mechanism 3 is also provided with a means for releasing the bowl to permit the bowl to rotate to a spreading or dumping position. A latch means is provided for locking the control mechanism in the cutting position, as illustrated in Figure 1, whereby the cutting edge 4 will be held in cutting relation to the ground. The latch means may be released when the bowl 2 has accumulated the desired load to permit the draft force to rotate the bowl from a cutting to a carrying position. The control mechanism includes a swinging draw-bar swingably mounted in the frame or, as illustrated in Figure 1, a swinging draw-bar 5 which is swung from frame 1 by means of a pair of forward links 6 and a pair of rearward links 7. The forward end of the swinging draft bar 5 may be provided with any suitable clevis means for coupling with a tractor. The rear links 7 extend above frame 1 and to the upper end thereof is pivotally mounted a pair of bars 8 which extend rearwardly, slidably passing through a suitable opening in the upper frame structure or standard 9 which holds the bar 8 in correct relation with a stop means 10 of the scraper bowl 1. Pivotally mounted upon the rear end of bars 8 is any form of suitable stop means 11 for engaging the bowl stop 10 to prevent rotation of the bowl. A tripping lever 12 is operatively mounted adjacent the rear end of bar 8 and when pulled forward by means of rope 13 will rotate the stop means 11 to disengage the bowl stop 10, thus permitting the bowl to roll as a wheel and dump the load. A suitable spreading stop (not shown) may be positioned upon the rear of the bowl to be engaged by the stop means 11 to lock the bowl in a spreading position.

As the control means 3 governs the position of the cutting edge 4, it is desirable to provide a stop means 14, which stop means includes an adjusting screw rod pivoted to the frame and extending upward and passing through an opening in plate 15 which connects the upper ends of links 7 and is provided with a stop shoulder 16 and an adjusting handle 17. By means just described the forward rotation of bowl 2 when rotating into cutting position, is regulated so that the cutting edge 4 will be held at a predetermined setting with relation to the ground.

A standard 18 is pivoted to the frame and when the scraper is disconnected from the tractor it is swung until it contacts with the ground so as to support the forward end of the frame. The latch means which is provided to lock the control mechanism 3 so that the bowl is maintained in a cutting relation with the ground until the desired load has been accumulated therein includes a latch bar 20 which is pivoted to the upper end of standard 9 by means of the pivot bolt 21 and extends forwardly and downwardly and is provided at adjacent its forward end with an abrupt shoulder 22 which is adapted to engage a stop roller 23 mounted between the bars 8 and journalled upon the stop bolt 24. As illustrated in Figures 1 and 2, the shoulder 22 of latch 20 is in engagement with the stop roller 23 and has locked the control mechanism 3 in a position to hold the cutting edge 4 of the scraper bowl in cutting relation with the ground. When the scraper bowl has accumulated the desired load, it is necessary to release the latch bar 20 to permit the tractive force to act through the control mechanism to rotate the scraper bowl rearwardly and thus elevate the cutting edge from a cutting to a carrying position. It will be understood that when the cutting edge 4 has been elevated slightly above the horizontal plane that it will no longer act to accumulate a further load but will permit the bowl to be dragged along and merely carry the load already accumulated to the location where the load is to be dumped.

When the desired load has been accumulated the rope 25 is actuated to swing the release lever 26 forwardly and as will be noted from Figure 2, the release lever 26 is pivoted to the latch bar 20 at 27 and has a projecting end 28 which engages the top of the stop roller 23 so that by actuating the release lever in a forward direction the projection 28 thereof engages the stop roller 23, causing the latch bar 20 to be raised until the shoulder 22 thereof is freed from the stop roller 23, and thus will permit the draft force acting through the control mechanism 3 to rotate the bowl to elevate the cutting edge to a carrying position.

It will be understood that the control mechanism is so proportioned that the tractive force transmitted therethrough to rotate the bowl greatly exceeds the force developed by the rotation of the bowl acting as a wheel and also the force of the cutting edge 4 in engaging with the ground during the accumulation of load, so that as soon as the latch 20 has been released the control mechanism will positively and immediately operate to rotate the bowl backward to elevate the cutting edge to a carrying position, irrespective of the amount of load accumulated within the bowl.

In the present invention the scraper bowl is positively locked in the cutting position and is held locked in that position until the release lever 26 is manually actuated to permit the draft force to rotate the bowl from a cutting to a carrying position. The release lever 26 may be actuated whether the bowl has accumulated a partial or full load, and in each case the draft force due to the unbalance thereof will positively rotate the bowl from a cutting to a carrying position.

It is understood that the embodiment of the invention described herein is only one of the many embodiments this invention may take, and I do not wish to be limited in the practice of the invention, nor in the claims, to the particular embodiment set forth.

I claim:

1. In a scraper, the combination of a frame, a bowl journalled thereto, a movable draw bar operatively carried by said frame, a bar operatively connecting said draw bar with said bowl, a stop carried by said bar, a standard mounted upon said frame, a latch journalled upon said standard and engageable with said stop, and a releasing lever journalled upon the end of said latch and operable for disengaging said latch from said stop.

2. In a scraper, the combination of a frame, a bowl journalled thereto, a movable draw bar operatively carried by said frame, a bar operatively connecting said draw bar with said bowl, a stop carried by said bar, a standard mounted upon said frame, a latch journalled upon said standard and engageable with said stop, and a releasing lever journalled upon the end of said latch and operable for disengaging said latch from said stop, and a spring means for yieldingly retaining said releasing lever in retracted position.

Signed at Wichita, Kansas, this 18th day of May, 1931.

ALVIN P. OLINGER.